April 1, 1930. E. P. SHNABLE 1,752,510
BUCKET EXCAVATOR
Filed May 12, 1927
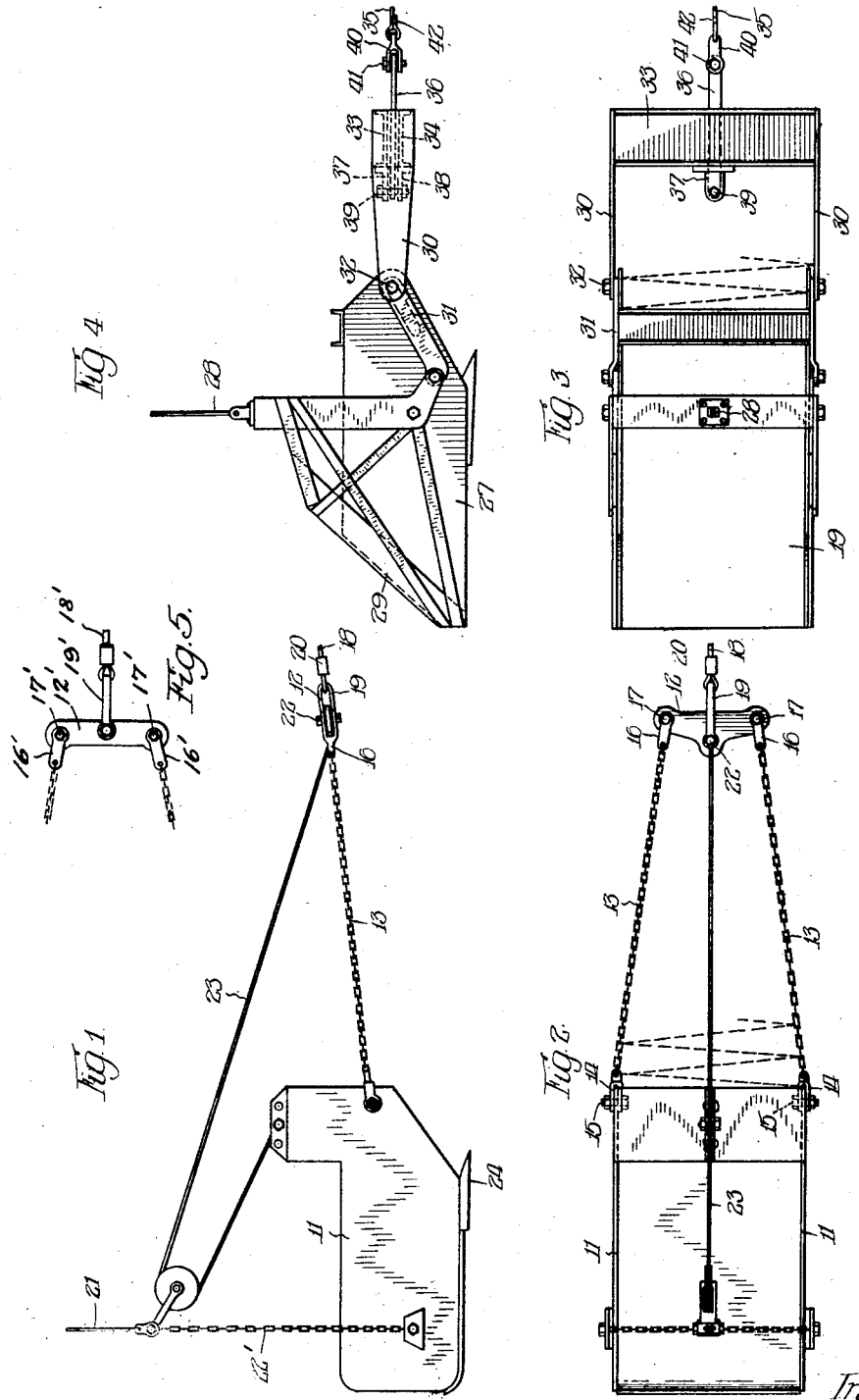

Patented Apr. 1, 1930

1,752,510

UNITED STATES PATENT OFFICE

EARL P. SHNABLE, OF CHICAGO, ILLINOIS

BUCKET EXCAVATOR

Application filed May 12, 1927. Serial No. 190,745.

The invention relates particularly to draft devices for drag line bucket excavators and affords many advantages over the devices of this class known in the art.

Heretofore, the draft mechanism for drag line bucket excavators has been so constructed, that during the loading operation, the bucket is drawn with a straight forward movement and when meeting with an obstruction or when operating in compact, heavy materials, sufficient power must be applied to cause the bucket to cut through the obstruction or directly through the material, which ever the case may be. This often results in injury to the bucket or the power and drag line equipment due to the excess strain placed thereon.

The primary object of the present invention is the provision of means for permitting a zigzag or shearing movement of the bucket during the filling operation, thereby lessening the strain on the bucket and equipment, since such movement permits the edge of the bucket to more easily cut through heavy materials and to avoid or cut obstructions located in the path of movement.

Other objects and advantages of the invention will be obvious to those skilled in the art upon perusal of the following specification and accompanying drawings, it being understood that the two preferred embodiments of the invention hereinafter delineated are given for purposes of illustration only, and are not intended to limit the scope of the protection sought, since changes may be made in the details of construction without departing from the true scope of the invention as defined by the appended claims.

That the invention may better understood, reference is had to the drawings wherein:

Fig. 1 is a view in side elevation of a bucket showing an evener bar attached thereto, wherein is embodied the principles of the invention;

Fig. 2 is a plan view of the same construction shown in Fig. 1;

Fig. 3 is a plan view showing the invention embodied in a bucket employing a rigid bail;

Fig. 4 is a side elevation of the device shown in Fig. 3; and

Fig. 5 is a modified construction of the device.

In the embodiment of the invention shown in Figs. 1 and 2 a bucket 11 is attached to the ends of a rigid cross member or evener bar 12 by means of chains 13. The chains are fastened to the bucket by bifurcated links 44 which are secured to opposite sides of the bucket by bolts 15 which pass through the links and the adjacent walls of the bucket. The other ends of the chains are pivotally connected to the ends of the evener bar 12 by the bifurcated links 16 which set over the ends of the bar and are secured thereto by the bolts 17. The evener bar 12 is attached to the drag line 18 by means of a bifurcated link 19, the arms of which pass over the bar and are pivotally mounted on the middle portion thereof by the bolt 22, which passes through the arms of the link and the evener bar.

The drag line 18 is fastened to the bifurcated link 19 by passing the line around the link and forming a loop, which is secured by a clamp 20 or other device now commonly in use.

The link 19 should be mounted on the evener bar 12 at a point where the dragging force will be so applied as to permit a zigzag or shearing movement of the bucket during its advance, as shown in dotted lines in Fig. 2. The point of mounting may vary depending upon the amount of freedom which it is desired to give the bucket. It has been found that the bucket will have the desired shearing movement if the drag line is mounted at any point behind or slightly in advance of the mounting of the chains 13 on the evener bar. However, if the drag line is mounted at a point too far in advance of the mounting of the side members or chains of the bail the desired shearing movement will be lost as the force of the drag line will be applied in a straight forward direction to the bucket and will not permit it to move in a zigzag course.

In Fig. 5 the bifurcated link 19' to which the drag line 18' is attached, is shown connected to the evener bar 12' slightly in advance of the bolts 17' which connect the bifurcated links 16' with the ends of the bar.

Other accessories of the standard bucket are shown, such as the hoisting line 21, the attaching chains 22', adjusting cable 23 and teeth 24. However, these are standard equipment and constitute no part of the present invention.

Figs. 3 and 4 show the invention incorporated in a bucket employing a rigid bail. In these figures a standard bucket 27 is shown, to which is attached the usual hoisting mechanism 28 and dumping equipment 29. The bail constitutes two side members 30 which are mounted in the slots 31 provided in the sides of the bucket by means of the bolts 32. A mounting is provided for attaching the draft mechanism by two channel bars 33 and 34 which are mounted back to back and spaced a short distance apart on the forepart of the arms 30. At the rear central portion of the channel bars is attached the mounting for a draft link 36. The said mounting comprises two right angular-shaped members 37 and 38 which are oppositely disposed to each other and spaced apart to permit the positioning of the draft link 36 therebetween, the member 37 is secured to the upper channel bar and the member 38 is secured to the lower channel bar by bolts or other suitable means, not shown. The draft link 36 is pivotally mounted between the members 37 and 28 by means of a bolt 39 which passes through the ends of the mounting members and one end of the link and projects through the opening between the two channel bars 33 and 34. The draft link is attached to the drag line 35 by means of a bifurcated member 40, the arms of which set over the end of the link and are secured thereto by the bolt 41. The drag line 35 is attached to the bifurcated member 40 in the usual manner, that is, looping the same through a hole provided in the end of the member and securing the cable by a clamp 42. The action of the draft link 36 is this embodiment of the invention is the same as that of the evener bar 12 in the embodiment first described, since, due to its pivotal mounting, and application of the pulling force, it permits the bucket to move from side to side when being filled and thereby causing it to shear through heavy or compact materials and to cut through or avoid solid obstruction.

I claim:

1. A draft device for buckets comprising a rigid member, means for connecting said rigid member to a bucket, a draft member pivotally connected to said rigid member at a point behind the place of mounting said connecting means.

2. A draft device for buckets comprising a bail adapted to be attached to a bucket, said bail including a rigid member, a draft member pivotally secured to said rigid member at a point behind the place of connecting said rigid member to the other portions of the bail.

3. A draft device for excavating buckets comprising a bucket, a bail adapted to be attached to a bucket, said bail including a rigid cross member, a link pivotally associated with said cross member and mounted at a point behind the place of connecting said rigid member to the remaining portions of said bail.

4. A draft device for excavating buckets including a bail, said bail comprising side members, a rigid evener member secured to said side members and a draft link secured to said evener member at a point behind the place of mounting said side members to said evener member so as to permit a shearing motion of the bucket when a pulling force is applied to said draft link.

5. A draft device for drag line excavating buckets, comprising a rigid evener member, side members secured to said evener member, said evener member having a longitudinal opening therein to permit the passage of a link therethrough, a link passing through the opening in said evener member and means for pivotally mounting said link on said evener member and in such relation thereto as to allow a shearing action of the bucket when a pulling force is exerted upon said link.

6. A draft device for excavating buckets including an evener bar, means for connecting said evener bar to the bucket, said evener bar having a central opening therein and a link passing through said opening and pivotally mounted to said evener bar at a point behind the place of connection between said evener bar and the means connecting said evener bar with the bucket.

In testimony whereof I have hereunto subscribed my name.

EARL P. SHNABLE.